Patented May 7, 1935

2,000,140

UNITED STATES PATENT OFFICE 2,000,140

PROCESS FOR THE DISTILLATION OF ZINC AND SIMILAR METALS

Arthur Leysner, Magdeburg, Germany, assignor to the firm Fried. Krupp Grusonwerk Aktiengesellschaft, Magdeburg-Buckau, Germany No Drawing. Application September 6, 1933, Serial No. 688,414. In Germany September 23, 1932

1 Claim. (Cl. 75—28)

The present invention relates to the distillation of zinc and similar metals, wherein it is known that nickel and cobalt in a finely divided state, especially as metallic sponge, act as catalysts in reduction processes, the action being apparently due to the fact that, in the presence of these metals, the ratio of CO to $CO_2$ is altered in favour of CO. In the distillation of zinc, cadmium and similar easily volatilizable metals, it is of decisive importance that the carbonic acid content of the gases should be kept as low as possible, because otherwise, the metallic vapours that are formed being immediately oxidized in an atmosphere of such gases, an excessive formation of dross takes place on the condensation of these metallic vapours. It has been found by experiment that, instead of nickel sponge or cobalt sponge, the pure metals or alloys of these metals can be used with very good results, not as sponge, but in a compact form, and it is one of the objects of the present invention to facilitate the use of such metals or alloys in this form.

According to the invention, the reduction chamber or vessel itself is made of the pure metals or of their alloys—e. g., of a nickel-chromium-iron alloy. In processes known hitherto, a gas suitable for the condensation operation can be produced only when the reduction temperature in the muffle is kept relatively high. The essential technical advance in the employment of reduction chambers or vessels according to this invention, which act catalytically on the composition of the gas, lies in the fact that a gas well suited for the condensation process can be obtained even at considerably lower temperatures. For example, when using a muffle as hitherto known for the distillation of zinc at 1100° C., there is obtained a gaseous mixture of CO and $CO_2$ with about 4 to 5% $CO_2$, while at the same temperature, by the use of a muffle whose inner surface consists of nickel, cobalt or their alloys a gas with less than 1% $CO_2$ is produced. In these experiments, no alteration of the surface of the metal chambers or vessels could be detected, from which it is to be concluded that the action on the gases is a catalytic one.

The process is of especial advantage in the employment of rotating muffles; this advantage may be attributed to the fact that, in this case, the vessel wall which acts as a catalyst comes alternately into contact with the reduction gases and with the charge that is mixed with carbon, so that the catalyst is kept especially reactive.

What I claim is:—

The process of recovering volatilizable metals by reduction of materials containing them, which comprises heating the materials in a rotary muffle, the walls of which are composed at least partly of one or both of the metals nickel and cobalt, while maintaining in the muffle an atmosphere composed principally of carbon monoxide, in order to reduce the materials and volatilize the metals.

ARTHUR LEYSNER.